US012694292B2

(12) United States Patent
Subrahmanya et al.

(10) Patent No.: US 12,694,292 B2
(45) Date of Patent: Jul. 28, 2026

(54) ENHANCEMENTS FOR DISTRIBUTED MACHINE LEARNING MODELS IN WIRELESS COMMUNICATION SYSTEMS

(71) Applicant: Apple Inc., Cupertino, CA (US)

(72) Inventors: Parvathanathan Subrahmanya, Sunnyvale, CA (US); Huaning Niu, Cupertino, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 688 days.

(21) Appl. No.: 18/324,038

(22) Filed: May 25, 2023

(65) Prior Publication Data

US 2024/0152752 A1     May 9, 2024

Related U.S. Application Data

(60) Provisional application No. 63/422,264, filed on Nov. 3, 2022.

(51) Int. Cl.
| | |
|---|---|
| *H04W 24/10* | (2009.01) |
| *G06N 3/0455* | (2023.01) |
| *G06N 3/08* | (2023.01) |
| *H04W 24/08* | (2009.01) |

(52) U.S. Cl.
CPC ............. *G06N 3/08* (2013.01); *G06N 3/0455* (2023.01); *H04W 24/08* (2013.01)

(58) Field of Classification Search
None
See application file for complete search history.

(56) References Cited

U.S. PATENT DOCUMENTS

| | | |
|---|---|---|
| 2022/0101204 A1 | 3/2022 | Ly |
| 2023/0010215 A1* | 1/2023 | Bliss ..................... G06F 9/3836 |

FOREIGN PATENT DOCUMENTS

WO         2022040655         2/2022

OTHER PUBLICATIONS

International Search Report for PCT/US2023/036274; Mar. 26, 2024.

* cited by examiner

*Primary Examiner* — Minh Trang T Nguyen
(74) *Attorney, Agent, or Firm* — Kowert, Hood, Munyon, Rankin & Goetzel, P.C.

(57)         ABSTRACT

A user equipment (UE) may receive, from a network node one or more reference signals and perform one or more measurements using the one or more reference signals. The UE may compress the one or more measurements into one or more measurement results and transmit the one or more measurement results to a server. The UE may request, from the server, at least one of one or more identifiers (IDs) or one or more models associated with the one or more IDs. The UE may receive, from the server, the at least one of the one or more IDs or one or more models, wherein the one or more IDs are provided based on the one or more measurement results. The UE may transmit, to the network node, an ordered list of the one or more IDs, receive a response from the network node indicating selection of an ID of the one or more IDs, and communicate with the network node using the ID.

20 Claims, 7 Drawing Sheets

ENHANCEMENTS FOR DISTRIBUTED MACHINE LEARNING MODELS IN WIRELESS COMMUNICATION SYSTEMS

PRIORITY INFORMATION

This application claims priority to U.S. provisional patent application Ser. No. 63/422,264, entitled "Enhancements for Distributed Machine Learning Models in Wireless Communication Systems," filed Nov. 3, 2022, which is hereby incorporated by reference in its entirety as though fully and completely set forth herein.

FIELD

The present application relates to wireless communications, and more particularly to systems, apparatuses, and methods for enhanced distributed machine learning model maintenance in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include UMTS (associated with, for example, WCDMA or TD-SCDMA air interfaces), LTE, LTE Advanced (LTE-A), NR, HSPA, IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for enhanced distributed machine learning model maintenance in a wireless communication system.

In some embodiments, a user equipment (UE) may receive, from a network node one or more reference signals and perform one or more measurements using the one or more reference signals. The UE may compress the one or more measurements into one or more measurement results and transmit the one or more measurement results to a server. The UE may request, from the server, at least one of one or more identifiers (IDs) or one or more models associated with the one or more IDs. The UE may receive, from the server, the at least one of the one or more IDs or one or more models, wherein the one or more IDs are provided based on the one or more measurement results. The UE may transmit, to the network node, an ordered list of the one or more IDs, receive a response from the network node indicating selection of an ID of the one or more IDs, and communicate with the network node using the ID.

According to some embodiments, the one or more reference signals may be channel state information-reference signals (CSI-RS). Additionally or alternatively, the UE may be configured to transmit the one or more measurements results to the first server while connected to external electrical power, while connected to Wi-Fi, while operating in high fidelity signal conditions, or during pauses in application activity. In some embodiments, the one or more measurement results may include metadata indicating at least one of a training status of the one or more IDs, a functionality, object, input, or output of the one or more IDs, latency benchmarks, memory requirements, or accuracy of the one or more IDs, a compression status of the one or more IDs, inferencing or operating conditions of the one or more IDs, or pre-processing and post-processing information of the one or more measurements.

According to further embodiments, the one or more measurements may include at least one of one or more channel state information (CSI) measurements or one or more beam sweeping measurements. Additionally or alternatively, the first server may be a machine learning model trainer and the second server may be a machine learning model server. In some embodiments, the ordered list of one or more IDs may be arranged in a preferential order based on one or more affinity metrics associated with the one or more IDs.

In some embodiments, a network node may be configured to receive, from a UE, a request for one or more training resources. The network node may transmit, to the UE, the one or more training resources and further receive an ordered list of one or more model identifiers (IDs) from the UE. The network node may then request and receive from a server, one or more training samples associated with the one or more model IDs. Furthermore, the network node may select a model ID of the one or more model IDs and transmit, to the UE, a response indicating the selection of the model ID. The network may then communicate, using the model ID, with the UE.

According to some embodiments, the one or more training samples may include metadata information corresponding to at least one of a date, time, or location of capture, network identification, cell identification, beam configuration and identification, device model and software version, or an assessment of the UE's operating environment based on the UE's local measurements and sensors. Additionally or alternatively, the one or more model IDs may include information corresponding to at least one of a network vendor identification, a UE vendor identification, a public land mobility network (PLMN) ID, a use case ID, or a number of neural networks for one or more use cases.

In some instances, the UE and network node may operate respectively as an encoder-decoder pair. Additionally or alternatively, the network node may be configured to associate at least one of a label or hash value with the one or more training resources. In some embodiments, the at least one of a label or hash value may indicate measurement conditions of the one or more training samples. According to some scenarios, the network node may be configured to request, from the UE, the one or more training samples associated with the one or more model IDs.

According to further embodiments, a network node may receive, from a UE, a request for one or more reference signals. The network node may transmit, to the UE, the one or more reference signals and receive, from the UE, one or more compressed measurement results. Additionally, the network node may transmit, to a first server, the one or more compressed measurement results. The network node may then receive, from the UE, an ordered list of one or more model IDs and request, from a second server, one or more training samples corresponding to the one or more model IDs. Additionally or alternatively, the network node may receive, from the second server, the one or more training samples and select a model ID from the one or more model IDs based on the one or more training samples. The network node may then transmit, to the UE, a response indicating the selection of the model ID and communicate with the UE using the model ID.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
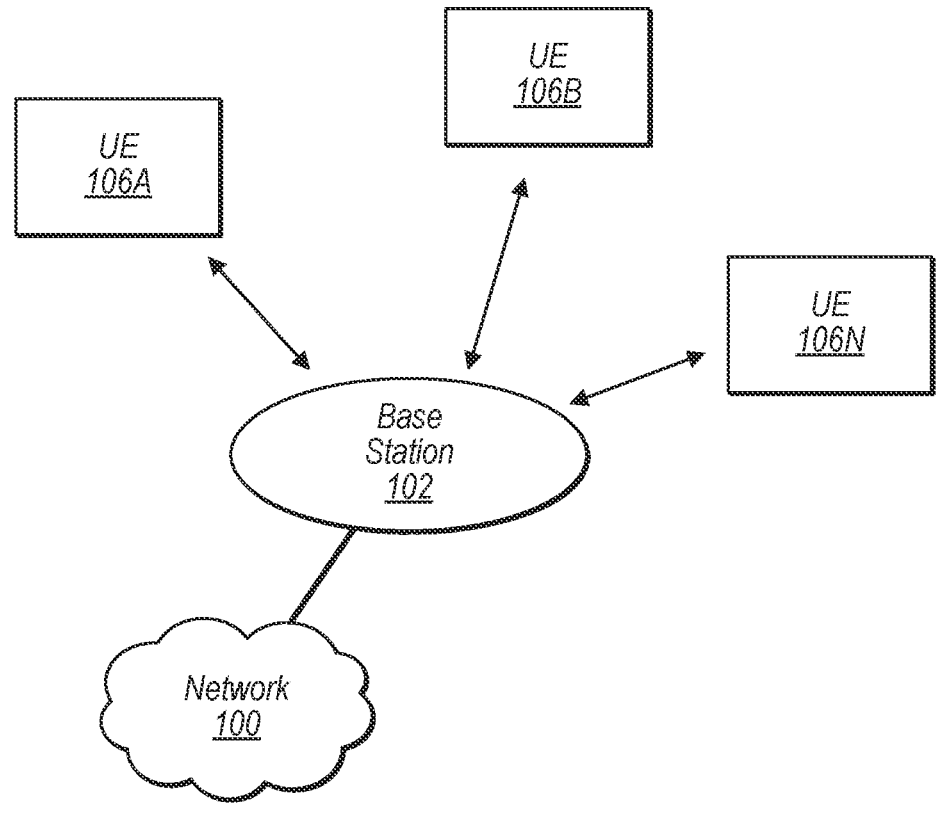
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
AI: Artificial Intelligence
NN: Neural Network
CSI: Channel State Information
CSI-RS: Channel State Information Reference Signal
SSB: Synchronization Signal Block
CQI: Channel Quality Indicator
PMI: Precoding Matrix Indicator
RI: Rank Indicator
FR: Frequency Range
gNB: Next Generation node-B
ML: Machine Learning
ID: Identifier
URL: Uniform Resource Locator
PLMN: Public Land Mobility Network
NW: Network Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
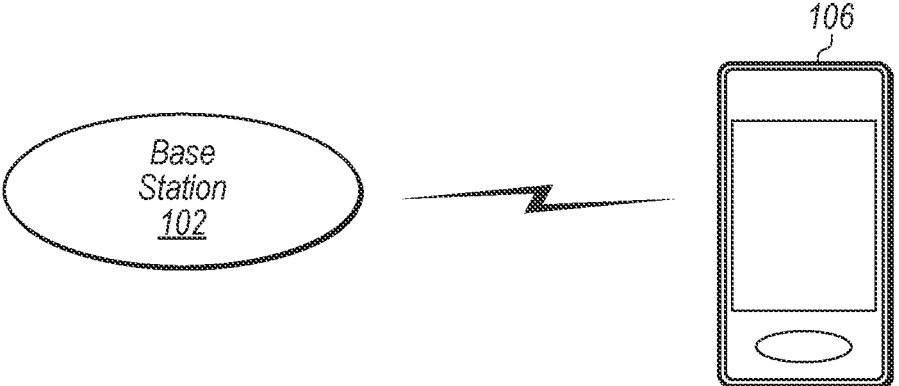
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as UMTS (WCDMA), LTE, LTE-Advanced (LTE-A), LAA/LTE-U, 5G NR, Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for model ID selection using machine learning assistance in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR), and separate radios for communicating using each of Wi-Fi and BLUETOOTH™. Other configurations are also possible.

Figure 3:
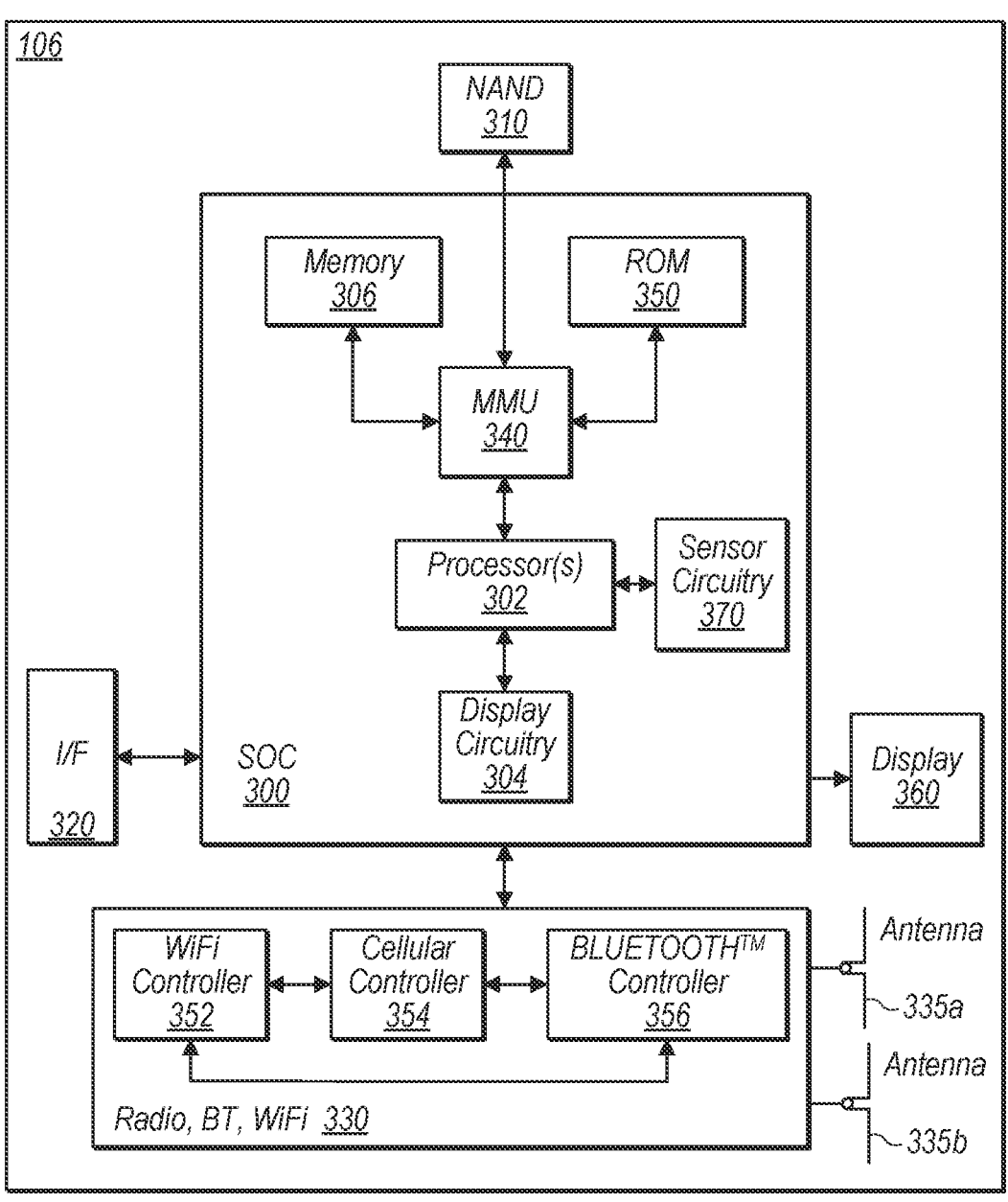
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for model ID selection using machine learning assistance in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for model ID selection using machine learning assistance in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
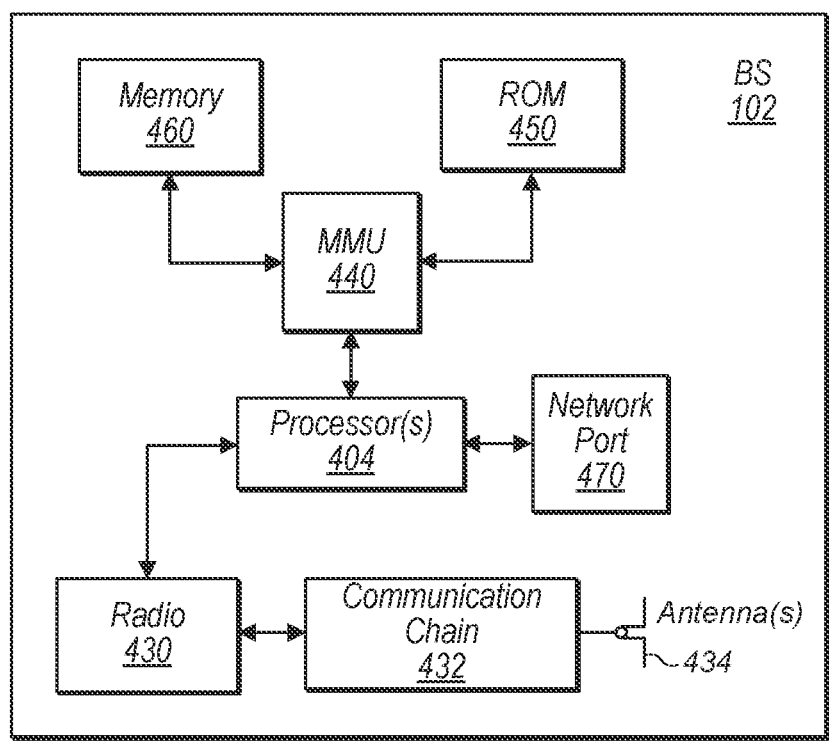
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, UMTS, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSB s) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, Which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Enhancements for Distributed Machine Learning Models in Wireless Communication Systems Increasing interest is developing in use of artificial intelligence and machine learning type algorithms and tools. It may be possible to utilize such tools in any of a variety of possible areas of cellular communication. One such area may include channel state feedback and beam measurement feedback used to train models for encoder/decoder pairs (e.g., UE/BS pairs) to improve link budget and/or other wireless communication system characteristics. For example, while encoder-decoder pairs may be sufficiently well-specified and efficient given the appropriate training samples and associated models, it may be beneficial to allow independent evolution (e.g., updating) of both the encoder and decoder models over time and as operating environments may change. More specifically, an encoder (e.g., a UE) may be able to utilize uplink compression techniques when providing information (e.g., training samples) for machine learning models while a base station (e.g., a decoder) may perform decoding or decompression of said training samples so as to be able to identify or select a compatible machine learning model for communication.

For example, there may be wireless communication scenarios in which a mobile device may need to send a summary of its observations to one or more entities such as a base station (e.g., a next generation node-B (gNB)), a network side server and/or a UE side server. Moreover, some examples of said observations may include channel state feedback and beam measurement feedback. Furthermore, it may be desirable to minimize the number of bits required to send the observations in order to reduce transmit power, extend battery life, and minimize network and over-the-air uplink resource consumption.

In some embodiments, one approach may be to compress the observations (or associated signaling) to minimize the number of bits required to transmit them. Compression techniques typically require a compressor (e.g., encoder such as a UE) and matching decompressor (e.g., decoder such as a base station). According to some scenarios, the encoder should typically be tuned to the statistical characteristics of the observations and acceptable distortion levels. These characteristics may be a function of the device itself (including software version), its operating environment (channel characteristics), the network configuration, among various other factors. In other words, it may be beneficial for an encoder (e.g., a wireless device) to perform occasional or scheduled measurements of its operating environment in order to be aware of the state of the channel in regards to how efficient its wireless communications may be. Accordingly, when reporting its measurements, it may be further desirable to minimize the number of bits needed to transmit this information. Therefore, before transmission, the encoder may benefit from compressing the measurements or measurement results (e.g., into a reduced number of bits) in order to achieve reduced transmit power (thereby potentially extending battery life) and minimizing uplink resource consumption. Similarly, a decoder in communication with the encoder may also benefit from the reduced number of bits (e.g., compression) of the measurements since decompression of a smaller number of bits may require less processing power.

Further, it may be desirable to allow the network and device software to evolve, update, or change at their own schedules and choose any implementation of encoder and decoder as long as the two remain compatible. The network may have additional considerations such as implementing a single decoder that is compatible with the encoders of various device types from different device manufacturers. Further, both device and network vendors may prefer to accomplish the development of encoders and decoders while preserving user privacy (e.g., identity, location, operating environment) and minimizing the revelation of proprietary information on device or network capabilities and configuration.

According to some embodiments, an encoder-decoder pair may be associated with a model ID. For example, the model ID may be further associated with or include observation statistics as well as fields of compatibility (e.g., NW vendor identification, UE vendor identification, etc.). Accordingly, the fields corresponding to compatibility may determine whether or not the model ID can be used for communication between the encoder (e.g., compressor) and decoder (e.g., decompressor). Accordingly, it may be beneficial for to develop model identifiers (IDs) for an encoder and decoder (and encoder/decoder pairs) using model learning techniques while maintaining compatibility.

For example, by associating a model ID with a collection of observation statistics (e.g., channel characteristics, hardware (HW) or software (SW) versions, network configurations, etc.), when the encoder/decoder pair (e.g., UE/BS pair, as one example) is operating under different conditions (e.g., operating under different channel characteristics, different HW/SW versions, etc.), a different model ID may be appropriately selected for more efficient communications corresponding to the pair's current operating conditions, according to some embodiments. Moreover, by updating the observation statistics associated with model IDs, the models can also be effectively updated through the association of the model to the model ID. In other words, updated models used by the encoder/decoder pair may reflect or include updated observation statistics (e.g., channel characteristics, HW/SW versions, etc.) through association of the model ID to the model. Accordingly, more efficient communications between the pair may be realized through continuous or semi-persistent training of the models based on observed conditions and subsequent selection of a compatible and most efficient model ID.

Furthermore, beam measurement techniques used for beamforming are widely used in wireless communication systems, typically as a technique to improve the link budget. The beamforming may be implemented in both a cellular base station (e.g., gNB, eNB, etc.) and a wireless device (e.g., a UE), for example in a cellular communication system. An appropriately matched and efficient beam pair can help increase the system performance, at least in some instances.

For a BS-UE beam pair, it may be the case that the BS transmits multiple downlink reference signals, where different BS beams may be applied to different reference signals, for the UE to measure the quality for each beam. The UE can further use different receive beams to receive different instances of one reference signal, e.g., to identify the best UE beam for each BS beam. The downlink reference signals provided by the BS could include synchronization signal blocks (SSBs), or channel state information reference signals (CSI-RS), in some embodiments. Thus, to identify the BS-UE beam pair, a UE may need to perform measurements for several BS beams with a UE beam sweeping operation.

However, it may be possible to use machine learning techniques to avoid the need for a UE to perform such extensive beam measurements. Such machine learning techniques may, for example, be used to help to identify the best BS beam without directly measuring BS beams, so that the UE can identify a UE beam to accommodate this best BS beam, potentially more quickly and/or with less overhead than otherwise might be possible.

Aspects of such machine learning techniques could be implemented on the BS side, in one possible scheme. Alternatively, the machine learning could be implemented on the UE side, in another possible scheme. As further possibilities, the machine learning could be implemented partially by each of the BS and UE sides. For example, in one scheme, training (e.g., machine learning) could be implemented on the BS side while inference is implemented on the UE side, while in another scheme, training could be implemented on the UE side while inference is implemented on the BS side. The inference may be based on metadata or operating conditions associated with a model ID. It may be possible that which of such schemes is used can be configured by the BS, potentially based at least in part on the capability of the UE to support one or more such schemes, e.g., as may be indicated by the UE in capability information provided by the UE to the BS.

In order to support use of such techniques, it may be important to provide a framework according to which a wireless device and a cellular network can exchange information to determine whether such techniques are mutually supported and potentially to negotiate or agree upon the characteristics and parameters according to which artificial intelligence/machine learning model maintenance performed, and/or to exchange information for supporting the operation of the artificial intelligence/machine learning use in performing cellular communication, as well as to provide techniques for the use of machine learning in performing cellular communication.

Figure 5:
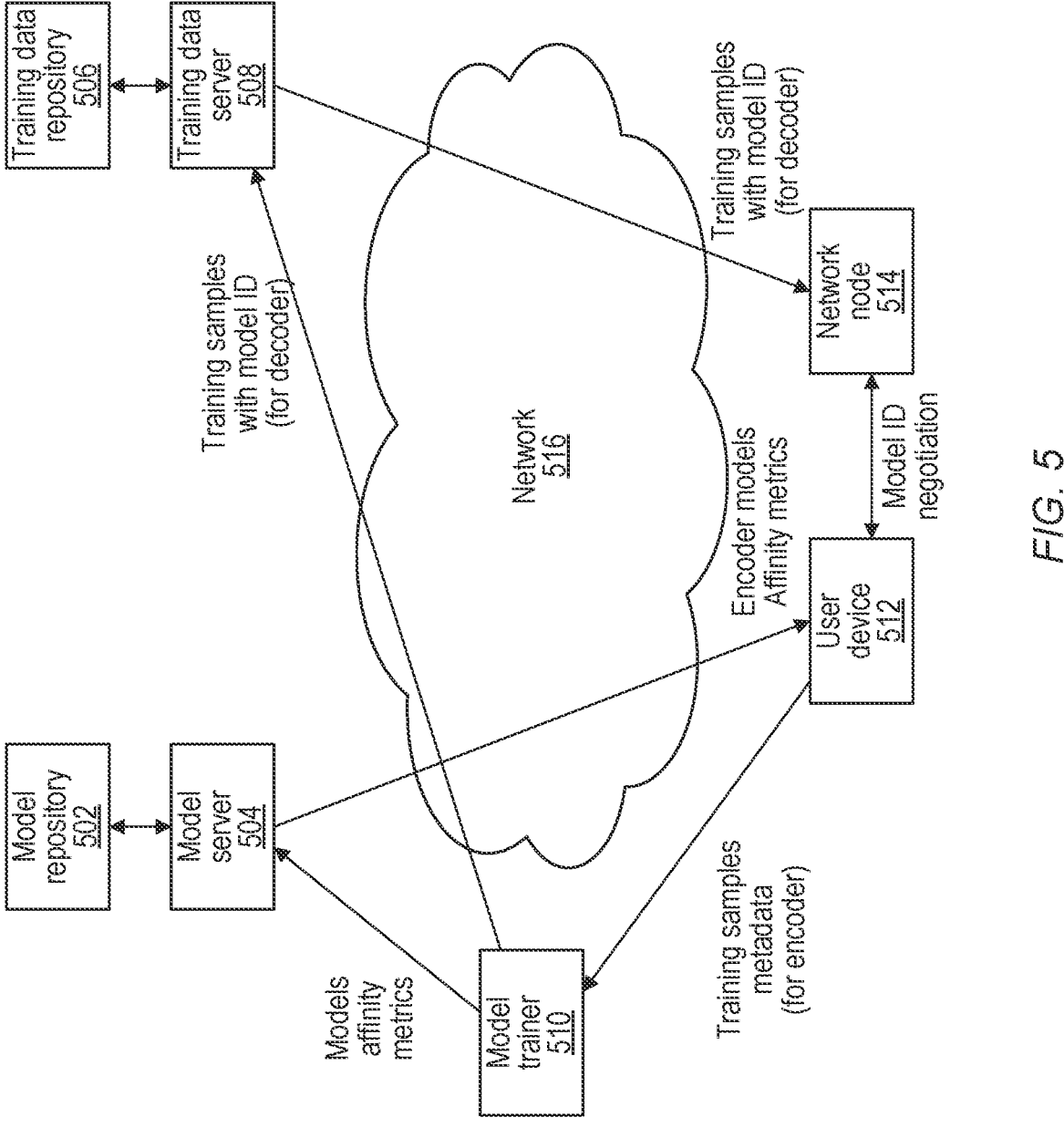
FIG. 5 illustrates an example wireless communication system including possible distributed entities for machine learning model maintenance, according to some embodiments.

FIG. 5—Distributed Entities for Machine Learning

FIG. 5 illustrates an example wireless communication system including possible distributed entities for machine learning model maintenance, according to some embodiments. More specifically, FIG. 5 illustrates how a user device 512 (which may be an example of UE 106) and network node 514 (which may be an example of BS 102) operating in a network 516 along with machine learning distributed entities may select and use a compatible and efficient model ID for communication.

For example, FIG. 5 illustrates a network 516 where a user device 512 may be communicating with a network node 514. Additionally, the network 516 may include various distributed machine learning entities such as model trainer 510, model server 504 (as well as model repository 502) and training data server 508 (as well as training data repository 506) which may allow for the collection of training samples from devices, training and distribution of models, and distribution of training samples to networks, according to some embodiments.

According to some embodiments, model trainer 510 may receive encoder or decoder training samples from devices such as user device 512 and generate encoder models based on the training samples. For example, user device 512 may collect or aggregate training samples (e.g., measurement results, for example) upon receiving training resources (e.g., reference signals) from network node 514. Accordingly, the model trainer 510 may be able to use or further analyze the training samples to generate/update/train machine learning models as well as form affinity metrics for the models.

Furthermore, model server 504 may maintain or store trained models associated with Model IDs in a repository and serve them to devices upon request. For example, the model server may contain a repository of stored models, associated affinity metrics, and/or model IDs in a model repository 502. Accordingly, once the model trainer 510 has trained a model based on the affinity metrics, the model trainer 510 may transmit the trained models and affinity metrics to the model server 504 which can be accessed by the user device 512.

According to some embodiments, model relationships may be accessed or requested by the user device from a model server. For example, the user device 512 may request encoder models and/or associated affinity metrics or model IDs from the model server 504. In some embodiments, the user device 512 may request the model server 504 for specific Model IDs which may further have been provided to the device during an operating system (OS) update or discovered during Model ID negotiation with a one or more networks. Additionally or alternatively, a user device 512 may provide metadata to the model server and seek a suitable model or set of models. In some embodiments, a user device 512 may also query the model server 504 for upgraded models based on an existing Model ID it has access to as well as potentially requesting decoder compatibility. Accordingly, the model server 504 may use its knowledge of model relationships to provide a suitable model for the device, according to some embodiments.

Additionally or alternatively, the model trainer 510 may also transmit training samples with model IDs for decoders to a training data server 508. The training data server 508 may store decoder training samples associated with Model IDs in a repository such as training data repository 506 and serve them to networks upon request. For example, the network node 514 may request training samples associated with model IDs from the training data server 508, according to some embodiments. Additionally or alternatively, networks may also query training data servers for the most up-to-date set of training samples evolved from a specific Model ID, according to some embodiments.

Accordingly, once the user device 512 has received its requested Model IDs it has access to (based on affinity metrics) and network node 514 has received its requested training samples, the user device 512 may send an ordered list of Model IDs to the network node 514 as part of a model ID negotiation. Once the network node 514 has received the ordered list, it may choose or select a Model ID from among the models for which it has a suitable decoder and further communicate the choice or selection to the device.

Figure 6:
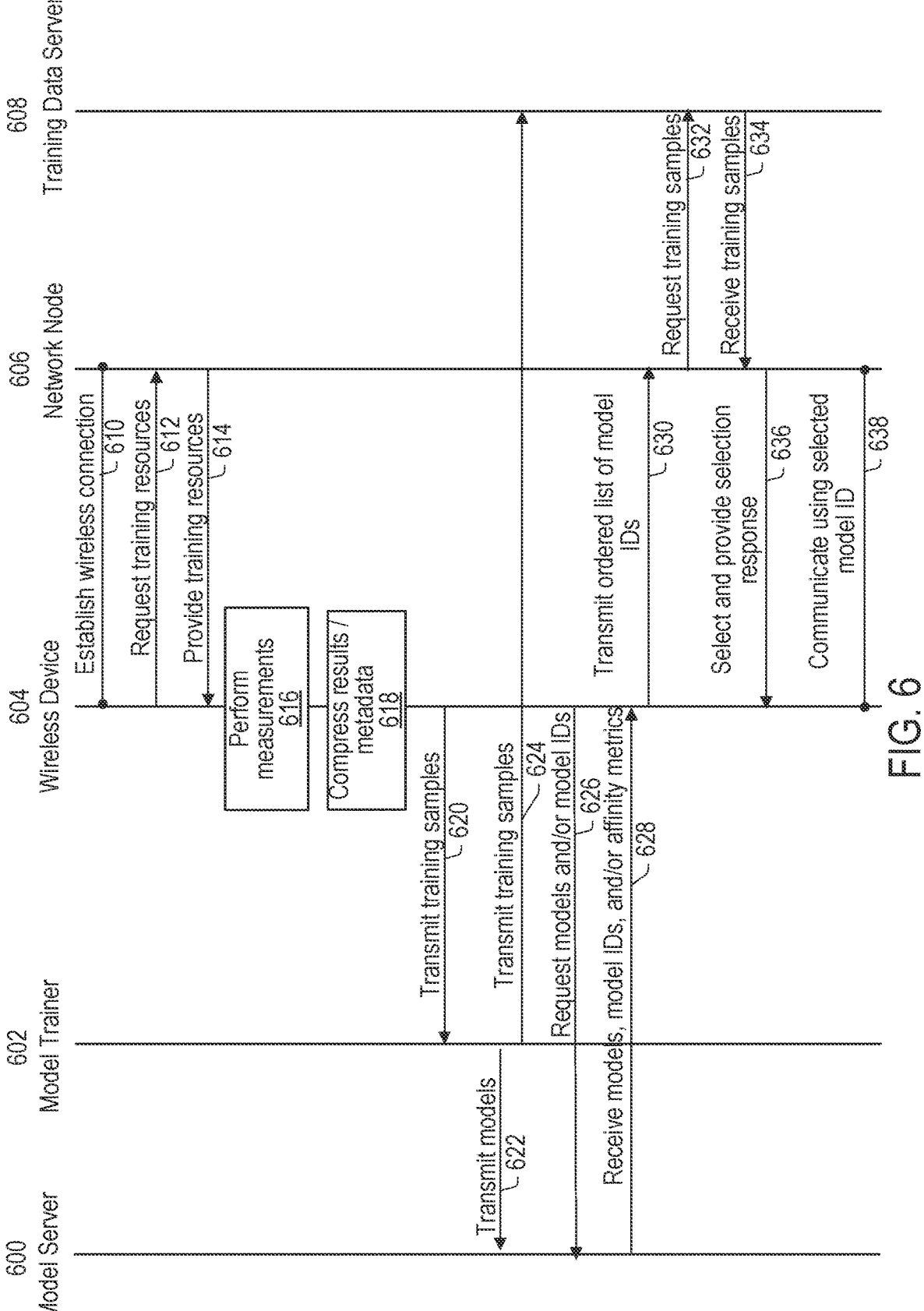
FIG. 6 is a communication flow diagram illustrating aspects of an example possible method for performing enhanced distributed machine learning model maintenance in a wireless communication system, according to some embodiments.

FIG. 6—Method for Enhanced Distributed Machine Learning Model Maintenance in a Wireless Communication System Thus, it may be beneficial to specify techniques for supporting machine learning based model ID selection. To illustrate one such set of possible techniques, FIG. 6 is a communication flow diagram illustrating a method for enhanced distributed machine learning model maintenance in a wireless communication system, at least according to some embodiments.

Aspects of the method of FIG. 6 may be implemented by a wireless device and/or a cellular base station, such as a UE 106 and/or a BS 102 illustrated in and described with respect to various of the Figures herein, or more generally in conjunction with any of the computer circuitry, systems, devices, elements, or components shown in the above Figures, among others, as desired. For example, in some embodiments, it may be the case that aspects of the method are implemented by a wireless device, whereas in other embodiments, it may be the case that aspects of the method are implemented by a cellular base station. For example, a processor (and/or other hardware) of such a device may be configured to cause the device to perform any combination of the illustrated method elements and/or other method elements.

Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 610, a wireless device 604 (e.g., UE 106 or user device 512) and a network node 606 (e.g., a cellular base station 102 or network node 514) may establish a wireless link. According to some embodiments, the wireless link may include a cellular link according to 5G NR. For example, the wireless device may establish a session with an access and mobility function (AMF) entity of the cellular network by way of one or more gNBs that provide radio access to the cellular network. As another possibility, the wireless link may include a cellular link according to LTE. For example, the wireless device may establish a session with a mobility management entity (MME) of the cellular network by way of an eNB that provides radio access to the cellular network. Other types of cellular links are also possible, and the cellular network may also or alternatively operate according to another cellular communication technology (e.g., UMTS, etc.), according to various embodiments.

Establishing the wireless link may include establishing a RRC connection between the wireless device 604 and the serving cellular base station, at least according to some embodiments. Establishing the first RRC connection may include configuring various parameters for communication between the wireless device and the cellular base station, establishing context information for the wireless device 604, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device 604 may operate in a RRC idle state or a RRC inactive state. In some instances, the wireless device 604 may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device 604 may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device 604 at a particular time. In some instances, the cellular connection between the wireless device 604 and the cellular network may include links with multiple cells that operate in different frequency ranges. For example, the wireless device 604 may be attached to at least one cell that operates in 3GPP frequency range 1 (FR1) as well as at least one cell that operates in 3GPP frequency range 2 (FR2), as one possibility.

At least in some instances, establishing the wireless link(s) may include the wireless device 604 providing capability information for the wireless device 604. Such capability information may include information relating to any of a variety of types of wireless device capabilities. Capability information may also or alternatively be provided from the wireless device to the cellular base station (or vice versa) at any of various other times and/or in any of various ways. At least as one possibility, the capability information could include an indication from the wireless device 604 to the cellular base station/network node 606 of machine learning model capability information for the wireless device, for example to indicate what machine learning model parameters (such as maximum number of hidden layers and maximum number of nodes per layer for a neural network type artificial intelligence model) are supported by the wireless device 604.

In 612, the wireless device 604 may request training resources from the network node 606, according to some embodiments. For example, once wireless device 604 (e.g., a UE) has established a connection with the network node 606 (e.g., a base station), the wireless device 604 may need resources from the network to make observations or measurements of the channel for channel estimation purposes or use in training machine learning models. For example, observing the channel state may use the measurement of channel state information—reference signals (CSI-RS)

transmitted by the network node 606. In other words, the training resources may include CSI-RS or resources associated with CSI-RS. Further, the training resources may include RS for beam management, selection, etc.

Accordingly, in 614, the network node 606 may transmit resources (e.g., CSI-RS) so that the wireless device 604 may perform channel measurements using said CSI-RS. In some scenarios, the network node 606 may need to curtail transmissions on some resources for the wireless device 604 to make observations. Accordingly, the network node 606 may provide the wireless device 604 training resources upon request, according to some embodiments. In other words, the process of collecting training samples (e.g., performing measurements) may be initiated by the wireless device 604 or initiated by the network node 606 which may configure the wireless device 604 with suitable measurement resources.

In 616, upon receiving the training resources (e.g., CSI-RS) from the network node 606, the wireless device 604 may perform its observations or measurements of the channel. For example, the CSI-RS may be configured in a resource set for measuring the quality of the downlink channel and the UE may periodically perform channel measurements and send channel state information (CSI) to a BS (e.g., the network node 606). Accordingly, the base station may be able to use this CSI to determine an adjustment of various parameters during communication with the wireless device, according to some embodiments. In some embodiments, the measurements may include at least one of CSI measurements or beam sweeping measurements. For example, the measurements may be performed using one or more receive beams of the UE and one or more transmit beams of the BS. The measurements may include reference signal receive power (RSRP), signal to noise interference ratio (SINR), signal to noise ratio (SNR), etc.

Furthermore, in 618 and according to some embodiments, the wireless device 604 may accumulate and/or compress the measurements or observations into results (e.g., training samples). In other words, these training samples may be aggregated on the wireless device 604. For example, the wireless device 604 may compress and/or aggregate the training samples/results/metadata information before being sending them to a machine learning entity or server such as model trainer 602.

Moreover, compression of the aggregated training samples (e.g., measurement results) and/or metadata may allow for the wireless device 606 to minimize the number of bits required to transmit them. In other words, through compression, the wireless device 606 may be able to encode the measurement information using fewer bits than the original representation. Accordingly, the restructuring or modification of the aggregated measurement information or metadata may be effectively reduced in size, according to some embodiments.

In 620, the wireless device 604 may transmit the compressed results and/or metadata (e.g., training samples) to a server such as model trainer 602 (e.g., model trainer 510). Furthermore, as transmission of training samples may be bandwidth intensive, it may be beneficial for the training samples to be transmitted during more suitable conditions. For example, the wireless device 604 may benefit from transmitting the training samples (e.g., measurement results) while connected to external electrical power, while connected to Wi-Fi, in good or high fidelity signal conditions, during pauses in application activity, or among various other scenarios.

In some embodiments, training samples may be accompanied by metadata such as date and time of capture (e.g., date/time of measurement), location of capture (e.g., the location of the measurement), network identification, cell identification, or beam ID as well as configuration, model and software version (among various other metadata) of the wireless device 604. Additionally or alternatively, the metadata may include the wireless device's own assessment of its operating environment based on local measurements or sensor data. According to some embodiments, the training samples or results may include information useable in generating or updated improved machine learning models such as model IDs for encoder/decoder pairs such as the wireless device 604 (encoder) and network node 606 (decoder).

According to some embodiments, various fields may be included as part of model ID (and associated with a neural network (NN), as one example). For example, a model ID may include fields such as network (NW) vendor identification, UE vendor identification, public land mobility network (PLMN) ID, use case ID, and/or number of NNs for use cases. For example, a use case ID may be an identifier associated with observed or pre-defined channel characteristics. Additionally or alternatively, different use cases may be associated with different numbers of NNs based on their complexity or processing requirements, according to some embodiments. Moreover, for model descriptions of the associated model ID, metadata information may also be included. For example, the metadata information may indicate training status (e.g., trained and tested network) and potential training data set indication, according to some embodiments. Additionally or alternatively, the metadata information may indicate the functionality/object, input/output of a machine learning (ML) model, latency benchmarks of the ML model, memory requirements of the ML model, accuracy of the ML model, and/or compression status of the model. Furthermore, the metadata information may indicate inferencing or operating conditions including urban environments, indoor environments, or dense macrocellular environments. Additionally or alternatively, the metadata information may indicate pre-processing and/or post-processing of the measurement for machine learning input/output.

In some embodiments, the network node 606 may associate a label or hash with a measurement resource. For example, the network node 606 may configure or associate a label (e.g., an identifier) or hash value in the CSI-RS resource configuration. According to some embodiments, the label or hash may allow the measurement condition to be known at a distributed machine learning entity/server (e.g., model trainer 602, as one example) through its coordination with the network operator or infra-vendor (e.g., a network vendor), whereby detailed network operation information may not be publicly available. Furthermore, in some instances, network operators or infra-vendors may share information about the network operation condition through a database which may be shared with the model trainer 602 (e.g., via a business agreement, for example), and the label and/or hash may provide the key to look up specific network operation information. Additionally or alternatively, the model trainer 602 may be configured to aggregate collected training samples. According to some embodiments, the network node 606 may request and receive training samples from the wireless device 604.

In some embodiments, model trainer 602 may be configured to use training samples received from one or more devices to utilize machine learning techniques to generate or update (e.g., train) models associated with model IDs. In other words, the model trainer 602 may use the training samples provided by the wireless device 604 to train encoder models. In some embodiments, model IDs may be organized in ways that capture relationships between models. For example, after an encoder and decoder are trained using an initial set of training samples, additional samples may be used along with the original set to evolve (e.g., update or change) the encoder model while keeping the same decoder model that was trained on the initial set of samples. One example reason would be to maintain compatibility with a decoder trained at the network based on the initial set since the network may not yet have access to the additional training samples. Subsequently, accumulated training samples may be used to create a new encoder-decoder pair (with the intent to share the additional samples with the network). Furthermore, knowledge of the relationships between models may allow the device and the network to determine the best models to use among the compatible ones they have access to. In some embodiments, model relationships may be sent to a model server from where devices may access or request them.

Accordingly, it may be beneficial for the model trainer 602 to associate a model ID with a collection of observation statistics. For example, observation statistics may correspond to one or more device manufacturers, device hardware and software versions, operating environments (channel characteristics), network configurations, among various other characteristics. In some embodiments, the characteristics may be explicitly captured through fields in the Model ID or implicitly only through the inclusion of observations corresponding to said characteristics.

Furthermore, the received training samples along with metadata (potentially included as part of the training samples) may be associated by the model trainer 602 through use of clustering algorithms such that the training samples and metadata are arranged into several (possibly overlapping) clusters or groups. For example, there may be a cluster that encompasses all training samples and additional clusters associated with low or high delay spreads, low or high signal to noise ratios (SNRs), among various other possibilities. Additionally or alternatively, an encoder-decoder pair may be trained (e.g., models corresponding to model IDs may be generated or updated) based on training samples belonging to each cluster and associated with a Model ID. According to some embodiments, a model ID may be a number (e.g., a numerical value). In other embodiments, a model ID may comprise one or more data fields. Additionally or alternatively, model IDs may be characterized as a string of bits. As one potential option, multiple encoder-decoder pairs (with associated Model IDs) may be trained for a cluster according to different trade-offs between the number of encoded bits and the fidelity of representation. In other words, some encoder-decoder pair models may be prioritized for training based on the size and quality of the training samples.

In some embodiments, different clusters may correspond to different operating environments. For example, one cluster may correspond to an indoor environment with a drastically different channel state as compared to another cluster corresponding to an outdoor environment. As another example, clusters may further be associated with different environments such as a maritime environment compared to a mountainous environment. Accordingly, these clusters would be indicative of different RF characteristics.

Moreover, an affinity metric model may be associated with each cluster. The affinity metric model may be a function of metadata as well as training samples, according to some embodiments. For example, a first model associated with a model ID "1" may be trained based on samples collected at low speeds and with a high SNR. Additionally or alternatively, a second model associated with a model ID "2" may be trained based on samples collected at high speeds and corresponding to a low SNR. Moreover, each ID corresponding to index "k" may correspond to a pair of observed characteristics or statistics (e.g., $Speed_k$, $SNR_k$). Accordingly, to select the most appropriate or efficient model when a wireless device is in either low/high SNR and/or traveling at low/high speeds, the device may be able to compute a metric (e.g., an affinity metric). For example, the device may compute a metric using the formula: alpha* (Current $Speed-Speed_k$)$^2$+Beta*(Current $SNR-SNR_k$)$^2$ where alpha and beta may be coefficients. The index k for which this quantity may be minimized may be the ID (e.g., "1" or "2") that is closest to the current operating conditions and therefore may have the greatest affinity or applicability for the determined ID. Moreover, according to this example, speed and SNR may be considered metadata rather than channel measurements themselves, according to some embodiments.

In other embodiments, an affinity metric may be calculated based on actual observations. For example, an ID corresponding to index k may be associated with a specific value for a ratio of largest and Nth largest channel eigenvalues corresponding to performed observations or measurements. As one example, N could be chosen to be the second or third largest channel eigenvalues. Accordingly, the device may be able to use its observations or measurements to compute the eigenvalues of the current channel it is in and compute the ratio of its largest to Nth largest eigenvalue. Thus, the device may then pick or select the index k for which the determined or computed ratio is closest. In other words, model IDs (which, in some instances, may be represented by a number) may be associated with affinity metrics which may, via a corresponding value or function, indicate the fidelity or other RF characterization of the model ID. Furthermore, the affinity metric models may be used by the wireless device 604 to order or request Model IDs it has access to, based on their suitability (e.g., compatibility and/or enhanced qualities) for the specific device and/or the network and operating environment, according to some embodiments.

In 622, the model trainer 602 may send or transmit models associated with model IDs and affinity metric models to another server such as model server 600 (e.g., model server 504). In 624, the model trainer 602 may send the training samples associated with Model IDs (for a decoder) to a different server such as a training data server 608 (e.g., training data server 508). Furthermore, the training data server 608 may also use a repository (e.g., training data repository 506) to store said training samples with model IDs (for decoders). According to some embodiments, the model trainer 602 may choose to not provide training samples that are considered outliers to either the model server 600 or training data server 608. In some embodiments, the functionality of the model trainer 602 may be distributed across multiple processing servers. Additionally or alternatively, the functionality of the model trainer 602 may also be collocated with any of the other entities, including the UE itself. In other words, the model trainer 602 may be collocated with model server 600, the wireless device 604, or the training data server 608, according to some embodiments. Additionally or alternatively, the training data server 608 may be collocated with model server 600, according to some embodiments.

Accordingly, in 626, wireless device 604 may order or request one or more model IDs or associated models it has access to and potentially based on affinity metrics from model server 600 or measurement results (e.g., training samples). For example, training samples collected on the device may correspond to affinity metric models associated with different model IDs. Moreover, according to some embodiments, the Model IDs may be ordered based on the resulting affinity metrics. Accordingly, the wireless device 604 may request in 626 model IDs based on the ordering from the affinity metrics. The model server 600 may store said model IDs and affinity metric models in a model repository (such as model repository 502). In 628, the model server 600 may transmit, in response to the wireless device 604's request, corresponding models, model IDs, and/or affinity metrics to the wireless device 604.

In 630, the wireless device 604 may transmit an ordered list of model IDs to the network node 606. For example, based on the affinity metrics and ordered model IDs (and/or models) received from the model server 600, the wireless device may be able to send a prioritized list of model IDs to the network which may indicate its preferred model IDs, according to some embodiments. In other words, the ordered list may include the one or more model IDs arranged in a preferential order based on the affinity metrics associated with the model IDs. According to some embodiments, the wireless device 604 may determine the order of the model IDs to be included in the ordered list.

In 632, having received the ordered list of model IDs from the wireless device 604, the network node 606 may request training samples from the training data server 608 corresponding to the model IDs in the ordered list. Furthermore, in 624, the training data server 608 may have received the training samples from model trainer 602. Accordingly, in 634, the training data server 608 may transmit the requested training samples to the network node 606 which may be used to train the decoder models to be compatible with a model ID from the ordered list of model IDs. In some embodiments, the network node 606 may request decoder training samples (e.g., training samples for the decoder (the network node 606)) from the wireless device 604. Accordingly, the wireless device 604 may use its current encoder model to generate training samples for the decoder and further transmit these decoder training samples to the network node 606. The network node may then use the decoder training samples to train its decoder model. According to some embodiments, the network node 606 may transmit additional requests to the training data server 608 after 634 with the intention of using received training samples for models in subsequent communication sessions.

In 636, the network node 606 may, based on its trained decoder models and potential preference of a model ID of the ordered list of model IDs, select a model ID to use for communication with the wireless device 604. According to some embodiments, the model ID may correspond to a model ID associated with both the decoder (e.g., network node, for example) and encoder (e.g., wireless device, for example). In other words, the selected model ID may be applicable or compatible with both the decoder and encoder (e.g., the encoder-decoder pair). Furthermore, the network node 606 may provide a response to the wireless device 604 indicating which model ID it has selected, according to some embodiments. Accordingly, in 638, the wireless device 604 and network node 606 may perform subsequent communications using the selected model ID. According to some embodiments, the wireless device 604 providing the ordered list of model IDs and the subsequent selection of a model ID by the network node 606 may be characterized as a model ID negotiation.

In some embodiments, the communications between wireless device 604 and network node 606 may benefit from selected model IDs which are associated with observation statistics. For example, the process discussed above may enable a continuous learning process throughout the device (and network) lifetime. Accordingly, this may allow a device (and network) manufacturer to aggregate field observations from all its devices and provide customized models for different devices, configurations, and operating environments. Moreover, the encoder/decoder pair (e.g., UE/BS) may further benefit their communications by minimizing over the air resource consumption for sending training samples, minimizing on-device storage and processing demands for training, and/or identification of outlier samples and their elimination, according to some embodiments.

As another example and according to some embodiments, a network-first approach may be utilized to select and/or evolve a compatible model ID for UE/BS communications. More specifically, while FIG. 6 describes models trained based on samples sent by a wireless device 604 to a model trainer 602, an alternative "network-first' approach may involve at least some similar steps performed by the network node 606 rather than the wireless device 604. For example, instead of the wireless device 604 transmitting the training samples (e.g., compressed results/metadata) to the model trainer 602 as shown in 618, the wireless device 604 may instead transmit them to the network node 606. Accordingly, the network node 606 may transmit them to model trainer 602. The model trainer 602 may then train an encoder-decoder pair and send model IDs to a model server and training samples to a training data server for the wireless device 604 and network node 606 to appropriately request them from. According to some embodiments, wireless device 604 may be configured to request the training data server 608 for training samples corresponding to model IDs.

According to some embodiments, a different model trainer (other than model trainer 602) associated with the UE or UE manufacturer may request training samples from the training data server 608. Accordingly, the different model trainer may be able to use the requested training samples to train an encoder model. Additionally or alternatively, the encoder model trained by the different model trainer may be uploaded to a different model server associated with the UE or UE-manufacturer. Moreover, according to some embodiments, the UE may request models and/or associated model IDs from this model server. In other words, a UE may utilize more than one model trainer and/or model server in order to train encoder models and request models and/or associated model IDs from, according to some embodiments.

It may be the case that the machine learning model is trained to use channel state information or beam measurement information (among various other measurement information) for one or more cells to infer the best model ID or encoder/decoder pair ID for a cell (or possibly multiple cells). For example, the machine learning model may be usable to take channel state information or beam measurement information for one or more cells and use the information to identify one or more preferred model IDs for the one or more UEs or network nodes operating in the one or more cells.

In some embodiments, the cell from which the channel state information is obtained and used to infer the preferred model IDs can be co-located or can be not co-located with another cell (possibly in another frequency range), at least according to some embodiments. In other words, at least in some embodiments, the input to the machine learning model may function as an identifier of the location and orientation of the wireless device to a sufficient degree, e.g., based on the training information provided to the machine learning model, as to allow effective inference of an effective model ID to use for cellular communication between the cellular base station and the wireless device via the cell or another cell corresponding to a different frequency range. Accordingly, embodiments are also envisioned in which the machine learning model could be trained on (and used as an input) one or more other types of information that can be correlated to a model ID to use for cellular communication between the cellular base station and the wireless device via the cell in a different frequency range, e.g., in addition or alternative to the channel state information for the cell(s) in the first frequency range.

Thus, at least according to some embodiments, the method of FIG. 6 may be used to provide a framework according to which model ID selection for a wireless device can be performed with the assistance of machine learning based techniques, and thus to potentially reduce wireless device power consumption and/or increase network resource use efficiency, at least in some instances.

Figure 7:
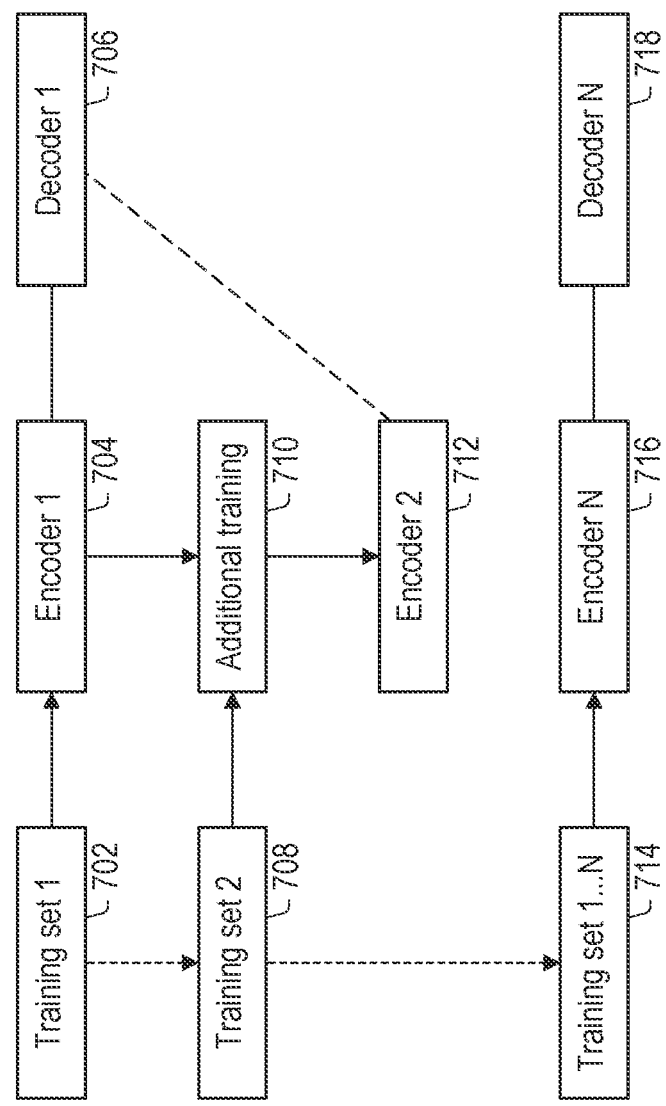
FIGS. 7-9 illustrate example aspects of various possible approaches to performing enhanced distributed machine learning model maintenance in a wireless communication system, according to some embodiments.
Figure 9:
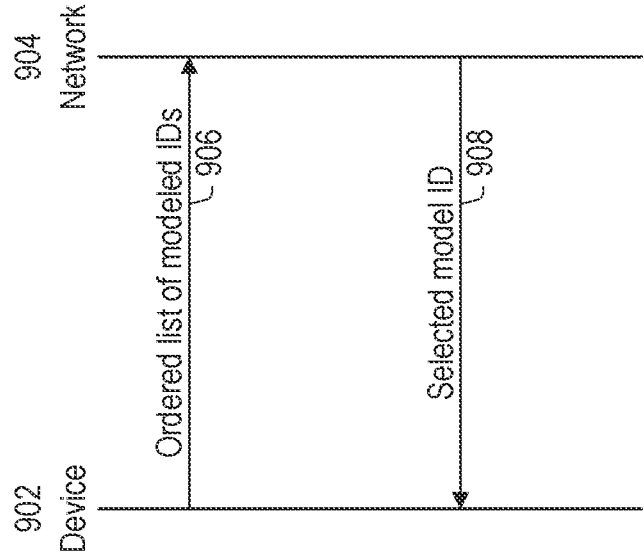
Figure 8:
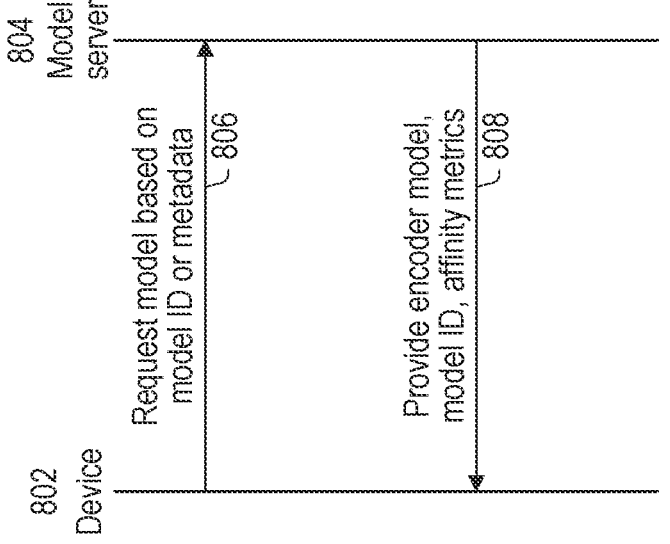

FIGS. 7-9 and Additional Information

FIGS. 7-9 illustrate further aspects that might be used in conjunction with the method of FIG. 6 if desired. More specifically, FIGS. 7-9 illustrate example aspects of various possible approaches to performing enhanced distributed machine learning model maintenance in a wireless communication system, according to some embodiments. It should be noted, however, that the exemplary details illustrated in and described with respect to FIGS. 7-9 are not intended to be limiting to the disclosure as a whole: numerous variations and alternatives to the details provided herein below are possible and should be considered within the scope of the disclosure.

FIG. 7 illustrates example relationships between training sets and encoder/decoder pairs, according to some embodiments. Model IDs may be organized in ways that capture relationships between models. For example, after an encoder and decoder are trained using an initial set of training samples, additional samples may be used along with the original set to evolve the encoder model while keeping the same decoder model that was trained on the initial set of training samples. One intention of doing so may be to maintain compatibility with a decoder trained at the network based on the initial set (since the network may not yet have access to the additional samples). Subsequently, accumulated or additional samples may be used to create a new encoder-decoder pair (with the intent to share the additional samples with the network). Knowledge of the relationships between models may allow the device and the network to determine the best models to use among the compatible ones they have access to.

According to some embodiments, if additional training samples become available after an encoder-decoder pair has been trained for a certain Model ID, the decoder can be kept fixed and the encoder may be incrementally retrained, benefiting from the additional training samples. This may enable for continuous improvement for encoder models on the device without any need for communication with network nodes. Additionally or alternatively, the user device 512 may be able to incrementally re-train the encoder/decoder pair together for a certain model ID and further generate additional incremental decoder training datasets. Accordingly, the user device may then send the incremental decoder training dataset with the model ID (e.g., an updated model ID version) to the network node to fine-tune (e.g., update) its decoder as well.

As one example, as shown in FIG. 7, encoder 1 704 may utilize training set 1 702 (using training resources requested from decoder 1 706) to evolve or update its model ID while maintaining compatibility with decoder 1 706. Encoder 1 704 may continue to evolve/update its model ID through additional training 710 (e.g., additional training resources) and associated training set 2 708 such that the updated encoder/decoder pair and model ID correspond to encoder 2 712 which has maintained its compatibility with decoder 1 706, according to some embodiments. Additionally or alternatively, the encoder/decoder pair may continue with even further additional training corresponding to training sets 1 . . . N 714 resulting in the updated pair of encoder N 716 and decoder N 718.

FIG. 8 illustrates an example communication flow diagram between a wireless device 802 and a model server 804. More specifically, FIG. 8 illustrates how a device 802 may request, from a model server 804, a model based on a model ID or metadata.

For example, a model server 804 may maintain the models it receives in a repository. Accordingly, devices such as device 802 may be able to request encoder models and associated affinity metric models from the model server 804. In some embodiments, a device 802 may request for specific model IDs from the model server 804. According to some embodiments, said model IDs may be provided to devices during operating system (OS) updates or discovered during model ID negotiation with networks. Additionally or alternatively, a device 802 may provide metadata to the model server 804 for purposes of receiving a suitable model or set of models upon request. In some embodiments, device 802 may also query a model server 804 for upgraded models based on an existing Model ID it has access to in addition to potentially requesting decoder compatibility. Accordingly, the model server 804 may use its knowledge of model relationships to provide a suitable model for the device 802. For example, as shown in 808, the model server 804 may provide the device 802 with one or more encoder models as well as associated model ID(s) and affinity metrics, according to some embodiments.

FIG. 9 illustrates an example communication flow diagram between a wireless device 902 and a network node 904. More specifically, FIG. 9 illustrates how a device 902 communicating with a network entity 904 may engage in model ID negotiation.

According to some embodiments, a device 902 may order or request model IDs it has access to, based on affinity metrics. For example, training samples collected on the device 902 may correspond to affinity metric models associated with different model IDs. In some embodiments, model IDs may be ordered based on the resulting affinity metrics initially provided the model trainer. Accordingly, device 902 may, as part of model ID negotiation, send an ordered list of model IDs in 906 to the network 904. Additionally or alternatively, the device 902 may choose not to include some models it has access to. For example, the device 902 may opt to conserve battery at times by restricting itself to the use of models that require fewer computational resources and hence, consume less power. According to some embodiments, the device 902 may suppress or not include one or more model IDs in the ordered list based on them being outliers or associated with fringe scenarios.

In 908, the network 904 may choose or select a Model ID from among the order list of model IDs for which it has a suitable decoder and communicates the choice or selection to the device, according to some embodiments. Additionally or alternatively to exchanging model IDs, the device 902 may also send the locations (e.g. uniform resource locators (URLs)) of training data samples associated with selected Model IDs. In some embodiments, the network 904 may similarly request the device 902 for training data samples (or training data server locations) for model IDs the device has access to. Accordingly, this may allow the network 904 to learn the decoders for new or updated encoders as time progresses.

According to some embodiments, the model ID negotiation illustrated in FIG. 9 may take place at different times. For example, the model ID negotiation may occur upon connection setup, upon changes in operating environment, after updates in tracking area, and/or upon data or application session changes, among various other scenarios. Additionally or alternatively, instead of the device 902 sending the locations of training data samples associated with a model ID to the network 904, the network 904 may request such locations from a server (e.g., a training data server) that stores a list of model IDs and corresponding training data sample locations. In some embodiments, the device 902 may send a timestamp to the network 904 which may indicate that it has all model IDs trained up to that timestamp. Accordingly, the network 904 may be able to use this timestamp to retrieve the corresponding list of model IDs by querying a server such as the training data server. With the knowledge that the device 902 may prefer a more recent model to an older one, the timestamp may enable the network 904 to recreate the ordered list of model IDs explicitly or implicitly. Additionally or alternatively, the networks history of interactions with several devices using different model IDs may allow the network 904 to form its own preferences among different models be measuring key performance indicators such as throughput, latency, capacity, among various other indicators. Furthermore, the network may use these preferences to make its choice or selection during model negotiation, according to some embodiments.

The machine learning techniques may operate to identify the best encoder/decoder pair or model ID by using measurement information of one or more cells of the environment to generate training samples and further create or update model IDs with more efficient communication configurations. In some embodiments, it may be possible that the measurement information is for cells that are or are not co-located with the cell for measurements are being provided. For example, it may be the case that the UE can operate in using carrier aggregation and/or dual connectivity modes (e.g., to potentially have links with cells in multiple frequency ranges). For dual connectivity mode, it may be the case that the two nodes can have some coordination on the information related to the measurements and/or model IDs.

A still further set of embodiments may include a cellular base station, comprising: one or more processors; and a memory having instructions stored thereon, which when executed by the one or more processors, perform steps of the method of one of the preceding examples.

A yet further set of embodiments may include a computer program product, comprising computer instructions which, when executed by one or more processors, perform steps of the method of any of one of the preceding examples.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a user equipment (UE) to:
receive, from a network node, one or more reference signals;
perform, using the one or more reference signals, one or more measurements;
compress the one or more measurements into one or more measurement results;
transmit, to a server, the one or more measurement results;
request, from the server, at least one of one or more identifiers (IDs) or one or more models associated with the one or more IDs;
receive, from the server, the at least one of the one or more IDs or one or more models, wherein the one or more IDs or one or more models are provided based on the one or more measurement results;
transmit, to the network node, an ordered list of the one or more IDs, wherein the ordered list of one or more IDs is arranged in a preferential order based on one or more affinity metrics associated with the one or more IDs;
receive, from the network node, a response indicating selection of an ID of the one or more IDs; and
communicate, using the ID, with the network node.

2. The apparatus of claim 1, wherein the one or more reference signals are channel state information-reference signals (CSI-RS).

3. The apparatus of claim 1, wherein the UE is configured to transmit the one or more measurements results to the server while operating according to at least one of the following conditions:
while connected to external electrical power;
while connected to Wi-Fi;
while operating in high fidelity signal conditions; or
during pauses in application activity.

4. The apparatus of claim 1, wherein the one or more measurement results include metadata corresponding to the one or more IDs, and wherein the metadata indicates at least one of:
a training status of the one or more IDs;
a functionality, object, input, or output of the one or more IDs;
latency benchmarks, memory requirements, or accuracy of the one or more IDs;
a compression status of the one or more IDs;
inferencing or operating conditions of the one or more IDs; or
pre-processing and post-processing information of the one or more measurements.

5. The apparatus of claim 1, wherein the one or more measurements comprise at least one of:
one or more channel state information (CSI) measurements; or
one or more beam sweeping measurements.

6. The apparatus of claim 1, wherein the server is a machine learning model trainer collocated with a machine learning model server.

7. The apparatus of claim 1, further comprising:
a radio operably coupled to the at least one processor.

8. An apparatus, comprising:
at least one processor configured to cause a network node to:
receive, from a user equipment (UE), a request for one or more training resources;
transmit, to the UE, the one or more training resources;
receive, from the UE, an ordered list of one or more model identifiers (IDs) wherein the ordered list of one or more model IDs is arranged in a preferential order based on one or more affinity metrics associated with the one or more model IDs;
request, from a server, one or more training samples associated with the one or more model IDs;
receive, from the server, the one or more training samples associated with the one or more model IDs;
select, based at least in part on the one or more training samples, a model ID of the one or more model IDs;
transmit, to the UE, a response indicating the model ID; and
communicate, using the model ID, with the UE.

9. The apparatus of claim 8, wherein the one or more training samples include metadata information corresponding to at least one of the following:
date of capture;
time of capture;
location of capture;
network identification;
cell identification;
beam configuration and identification;
device model and software version; or
an assessment of an operating environment of the UE based on local measurements and sensors of the UE.

10. The apparatus of claim 8, wherein the one or more model IDs include information corresponding to at least one of:
a network vendor identification;
a UE vendor identification;
a public land mobility network (PLMN) ID;
a use case ID; or
a number of neural networks for one or more use cases.

11. The apparatus of claim 8, wherein the UE and the network node operate respectively as an encoder-decoder pair.

12. The apparatus of claim 8, wherein the at least one processor is further configured to cause the network node to:
associate at least one of a label or hash value with the one or more training resources.

13. The apparatus of claim 12, wherein the at least one of the label or the hash value indicates measurement conditions of the one or more training samples.

14. The apparatus of claim 8, wherein the at least one processor is further configured to cause the network node to:
request, from the UE, the one or more training samples associated with the one or more model IDs.

15. A network node, comprising:
at least one processor configured to cause the network node to:
receive, from a user equipment (UE), a request for one or more reference signals;
transmit, to the UE, the one or more reference signals;
receive, from the UE, one or more compressed measurement results;

transmit, to a first server, the one or more compressed measurement results;

receive, from the UE, an ordered list of one or more model IDs, wherein the ordered list of one or more model IDs is arranged in a preferential order based on one or more affinity metrics associated with the one or more model IDs;

request, from a second server, one or more training samples corresponding to the one or more model IDs;

receive, from the second server, the one or more training samples;

select, based at least in part on the one or more training samples, a model ID from the one or more model IDs;

transmit, to the UE, a response indicating the model ID; and communicate, using the model ID, with the UE.

16. The network node of claim 15, wherein the one or more reference signals are channel state information-reference signals (CSI-RS).

17. The network node of claim 15, wherein the one or more compressed measurement results include metadata indicating at least one of:

a training status of the one or more model IDs;

a functionality, object, input, or output of the one or more model IDs;

latency benchmarks, memory requirements, or accuracy of the one or more model IDs;

a compression status of the one or more model IDs;

inferencing or operating conditions of the one or more model IDs; or pre-processing and post-processing information of the one or more compressed measurement results.

18. The network node of claim 15, wherein the one or more compressed measurement results are based on at least one of:

one or more channel state information (CSI) measurements; or one or more beam sweeping measurements.

19. The network node of claim 15, wherein the first server is a machine learning model trainer collocated with a machine learning model server.

20. The network node of claim 15, wherein the one or more training samples include metadata information corresponding to at least one of the following:

date of capture;

time of capture;

location of capture;

network identification;

cell identification;

beam configuration and identification;

device model and software version; or an assessment of an operating environment of the UE based on local measurements and sensors of the UE.

* * * * *